United States Patent

Senn et al.

[11] Patent Number: 5,951,607
[45] Date of Patent: Sep. 14, 1999

[54] AUTONOMOUS CRAFT CONTROLLER SYSTEM FOR LANDING CRAFT AIR CUSHIONED VEHICLE

[75] Inventors: Keith A. Senn, Panama City Beach; Jaime Bunczek, Panama City, both of Fla.

[73] Assignee: The United States of America as represented by the Secretary of the Navy, Washington, D.C.

[21] Appl. No.: 08/812,169

[22] Filed: Mar. 6, 1997

[51] Int. Cl.[6] .................................................. G06F 17/00
[52] U.S. Cl. .................................. 701/1; 701/3; 701/16; 244/75 R; 244/158 R; 244/176
[58] Field of Search .................. 701/3, 11, 13, 701/14, 15, 16, 1, 226; 244/30, 50, 75 R, 176, 158 R

[56] References Cited

U.S. PATENT DOCUMENTS

| | | | |
|---|---|---|---|
| 4,161,780 | 7/1979 | Rudolph et al. | 701/13 |
| 4,836,121 | 6/1989 | Kordon | 114/67 A |
| 5,528,502 | 6/1996 | Wertz | 701/226 |

Primary Examiner—William A. Cuchlinski, Jr.
Assistant Examiner—Gertrude Arthur
Attorney, Agent, or Firm—Harvey A. Gilbert; Donald G. Peck

[57] ABSTRACT

An autonomous craft controller system for automated control of operation of a landing craft air-cushioned vehicle includes a command processor, a bow thruster controller, a prop pitch controller, and a rudder controller. The command processor receives and processes multiple inputs relating to vehicle heading, location and velocity and, in response thereto, produces multiple outputs relating to vehicle acceleration and vehicle heading, velocity and position error. The bow thruster controller receives and processes as inputs some of the multiple outputs from the command processor and, in response thereto, produces a bow thruster command output. The prop pitch controller receives and processes as inputs some of the multiple outputs from the command processor and, in response thereto, produces port and starboard prop pitch command outputs. The rudder controller receives and processes as inputs some of the outputs from the command processor and outputs from the prop pitch controller and, in response thereto, produces a rudder command output.

16 Claims, 6 Drawing Sheets

AUTONOMOUS CRAFT CONTROLLER SYSTEM FOR LANDING CRAFT AIR CUSHIONED VEHICLE

BACKGROUND OF THE INVENTION

1. Field of the Invention

The present invention generally relates to the operation of a landing craft air-cushioned (LCAC) vehicle and, more particularly, is concerned with an autonomous craft controller system for automated computer-controlled operation of LCAC vehicle.

2. Description of the Prior Art

In support of an Explosive Neutralization Advanced Technology Demonstration (ENATD) fire control algorithm development, a test series was performed aboard the LCAC vehicle. The LCAC vehicle is a fully amphibious high speed hovercraft capable of carrying a 60-ton payload. The purpose of this test series was to characterize LCAC vehicle motion during low speed repositioning and hovering maneuvers as a function of operator and environmental input. Since the ENATD fire control concept consists of unguided mine clearing munitions launched from an unstabilized platform, LCAC vehicle motion is critical to system accuracy.

It is desirable to give the craft operator the option to turn craft controls over to a computer thereby providing relief from stressful maneuvers, such as position keeping, lane navigation, and precise craft control necessary for obtaining ballistic solutions in a timely manner. Consequently, a need exists for design and development of means to control operation of the LCAC vehicle autonomously via computer to provide the craft operator with the option of turning craft controls over to the computer from time to time.

SUMMARY OF THE INVENTION

The present invention provides an autonomous craft controller (ACC) system being designed to satisfy the aforementioned need. The ACC system of the present invention provides for computer-controlled operation of a landing craft air-cushioned (LCAC) vehicle.

During the testing aboard the LCAC vehicle, data on the vehicle's six degrees of freedom and rates was gathered, in addition to the positions of the operator's controls. Wind speed and sea spectra data were also gathered. From this data, the response of the LCAC vehicle to operator and environmental inputs was modeled to a sufficient degree to enable fire control algorithm development and evaluation. Since repositioning and reorienting of the LCAC vehicle is critical to the generation of ballistics solutions for an unguided munitions launched from an unstabilized platform, an autonomous control algorithm which underlies the ACC system of the present invention was derived and then implemented in a vehicle response model for evaluation. The autonomous control algorithm generates the craft operator inputs directly under computer control.

Accordingly, the present invention is directed to an autonomous craft controller system for automated control of operation of a landing craft air-cushioned vehicle. The autonomous craft controller system comprises: (a) a command processor; (b) a bow thruster controller; (c) a prop pitch controller; and (d) a rudder controller. The command processor receives and processes multiple inputs relating to vehicle heading, location and velocity and, in response thereto, produces multiple outputs relating to vehicle acceleration and vehicle heading, velocity and position error. The bow thruster controller receives and processes as inputs some of the multiple outputs from the command processor and, in response thereto, produces a bow thruster command output. The prop pitch controller receives and processes as inputs some of the multiple outputs from the command processor and, in response thereto, produces port and starboard prop pitch command outputs. The rudder controller receives and processes as inputs some of the outputs from the command processor and outputs from the prop pitch controller and, in response thereto, produces a rudder command output.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Introduction

Figure 1:
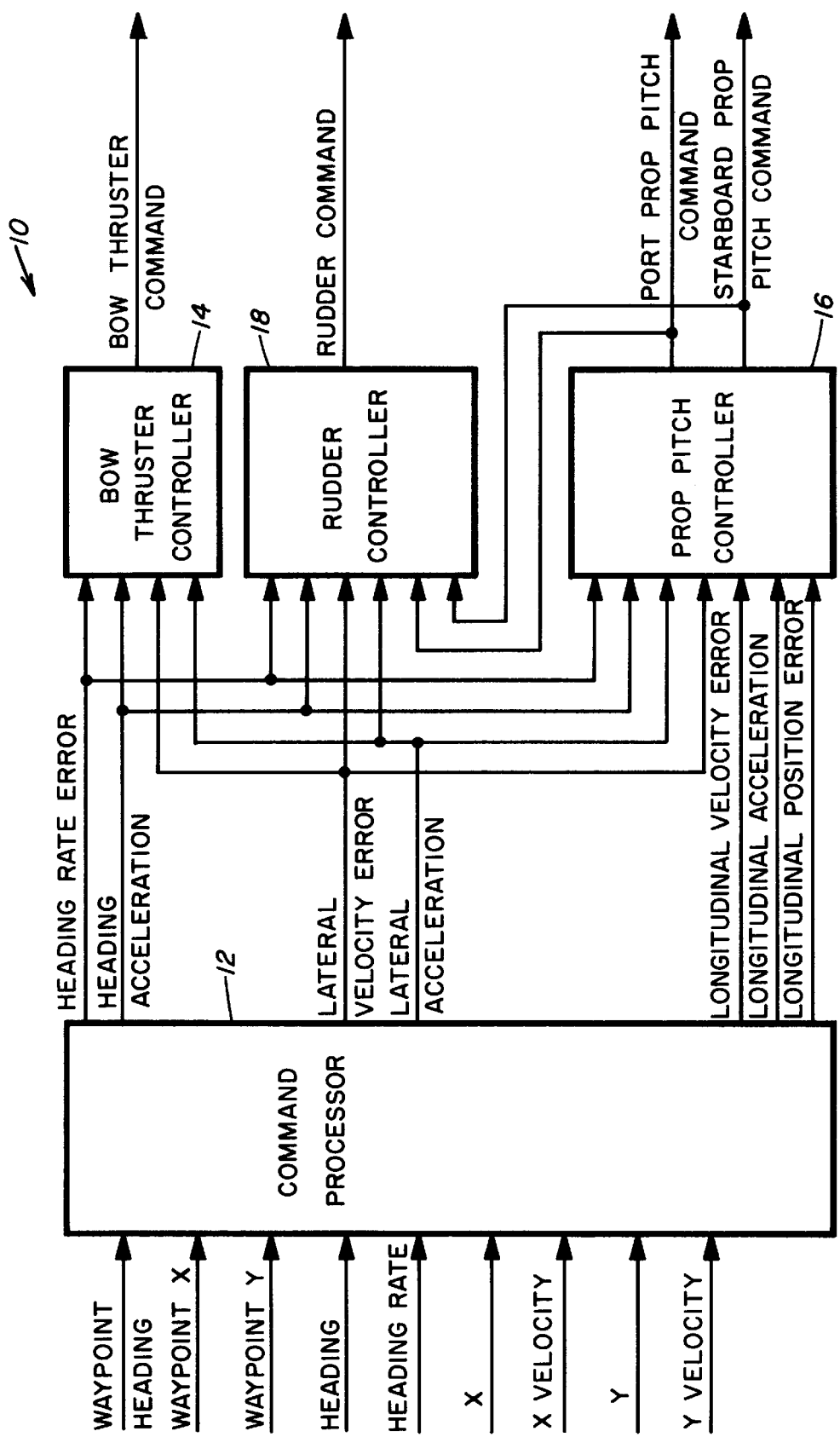
FIG. 1 is a general block diagram of an autonomous craft controller (ACC) system of the present invention for automated computer-controlled operation of the LCAC vehicle.

Referring to the drawings and particularly to FIG. 1, there is illustrated an autonomous craft controller (ACC) system, generally designated 10, of the present invention which is a control algorithm useful to operate the LCAC vehicle autonomously via computer. It provides the craft operator with the capability of turning the controls of the craft over to a computer providing relief from stressful maneuvers such as position keeping and lane navigation. The pre-existing components and mode of operation of the LCAC vehicle are well-known to those of ordinary skill in this art and so the LCAC vehicle components and mode of operation need only be referred to hereinafter to the limited extent necessary for one of ordinary skill in this art to understand the ACC system 10 of the present invention.

The control algorithm of the ACC system 10 is comprised of multiple-input, single-output, nested proportional derivative (PD) rate controllers that manipulate four pre-existing operator controls of the LCAC vehicle, such being the pre-existing bow thrusters, port and starboard propeller pitch controllers and rudders, to control three degrees of freedom: craft heading, longitudinal position and lateral position. Navigational data is processed and converted to a local user definable coordinate system (LCS) in which waypoints are defined. These waypoints encompass a desired position and heading. The controller structure is implemented in software. Since the LCAC vehicle uses a fly-by-wire system, interfacing to the LCAC vehicle controls is done via a pre-existing Control Systems Electronic Package (CSEP) of the LCAC vehicle. Hardware used to implement the ACC system 10 includes a Litton LN-100G GPS Inertial Navigational Assembly (GINA) for navigation data, a personal computer (PC) to process navigation/motion data and generate craft control inputs, a custom PC/CSEP interface box to relay commands from the computer to the LCAC vehicle, a switch and indication light mounted near the craft operator to select autonomous operation, and a laptop computer to display data on autonomous control mission status.

ACC System—Overview

Figure 2A:
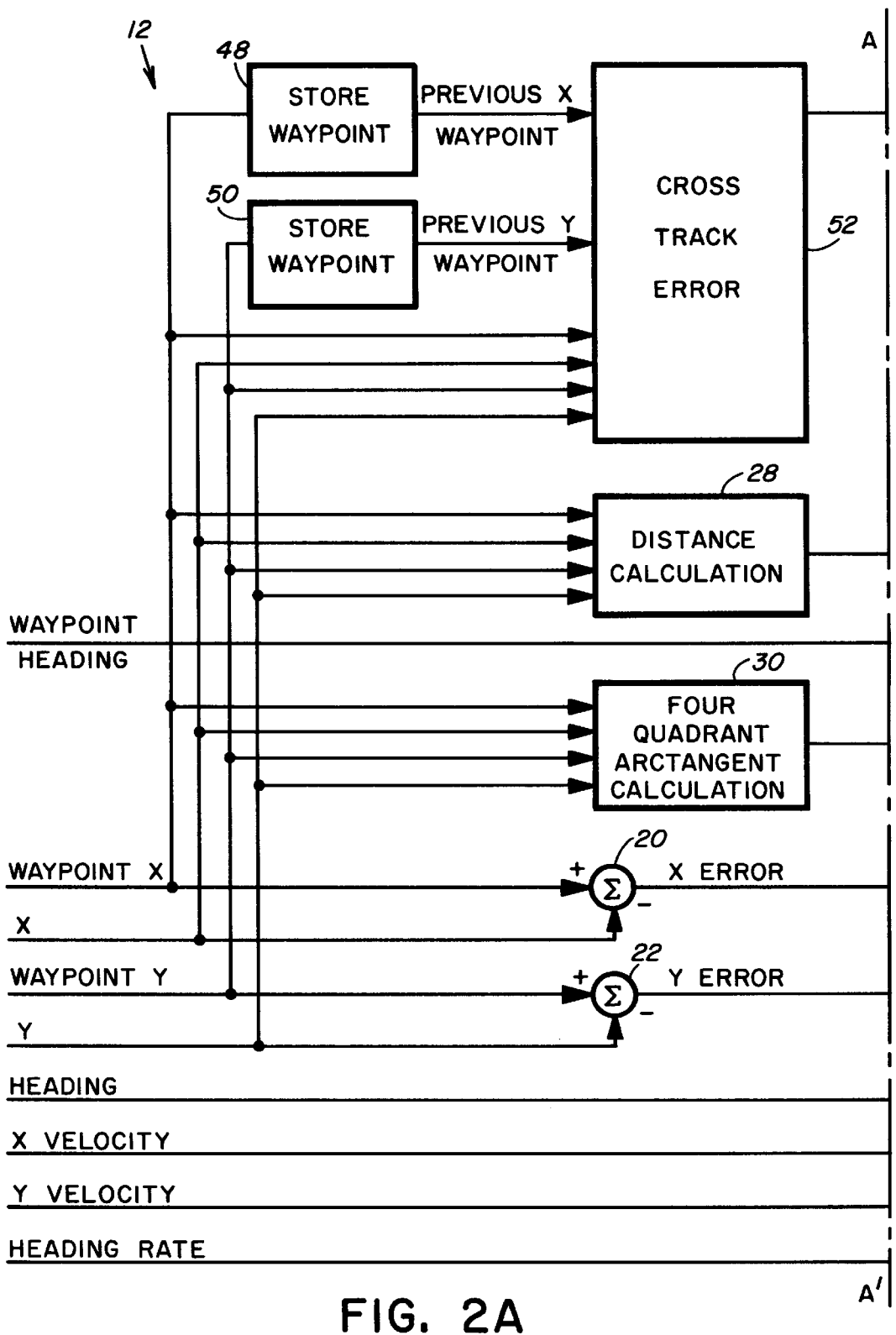
FIGS. 2A, 2B and 2C together are a detailed block diagram of a command processor of the ACC system.
Figure 2B:
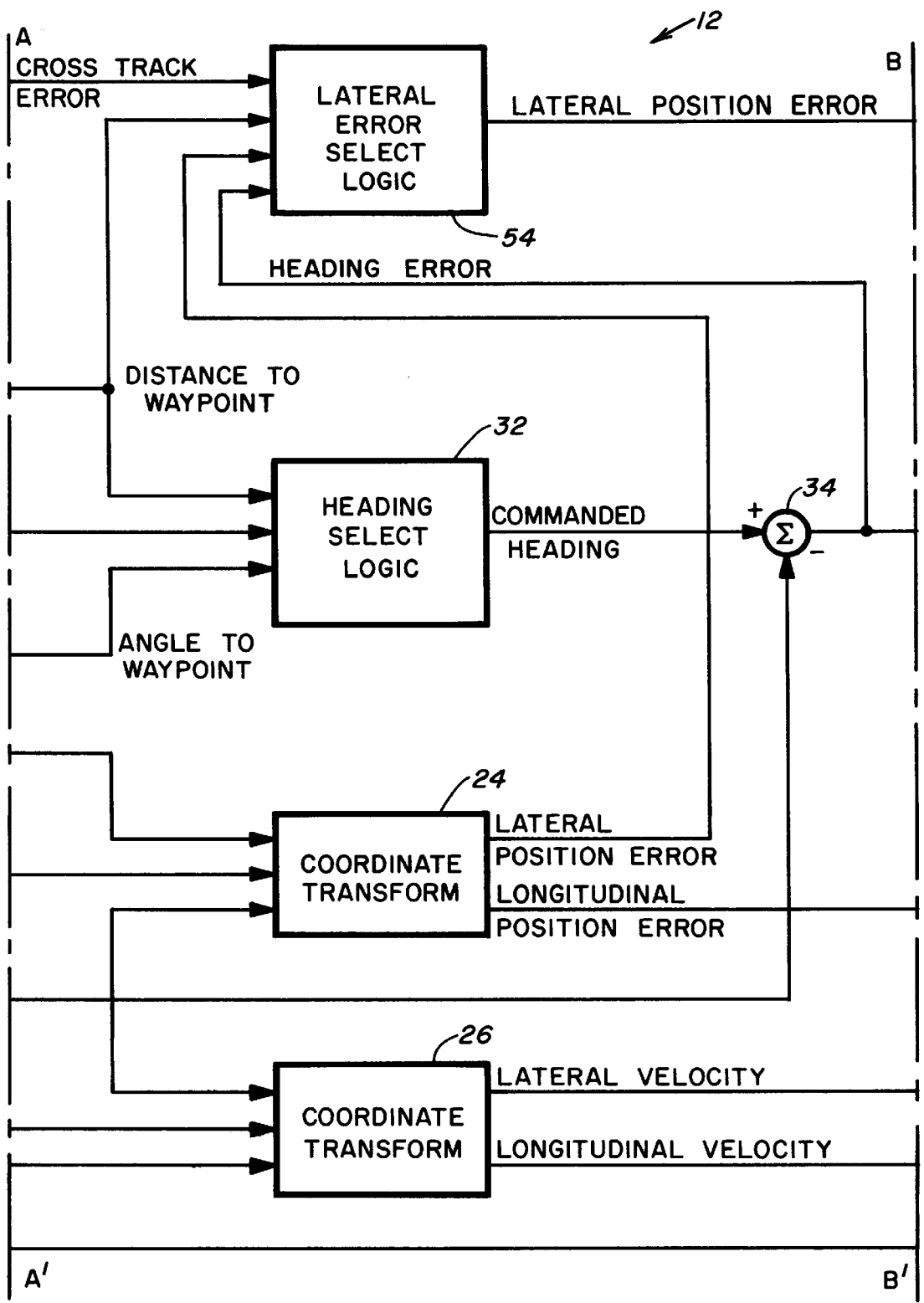
Figure 2C:
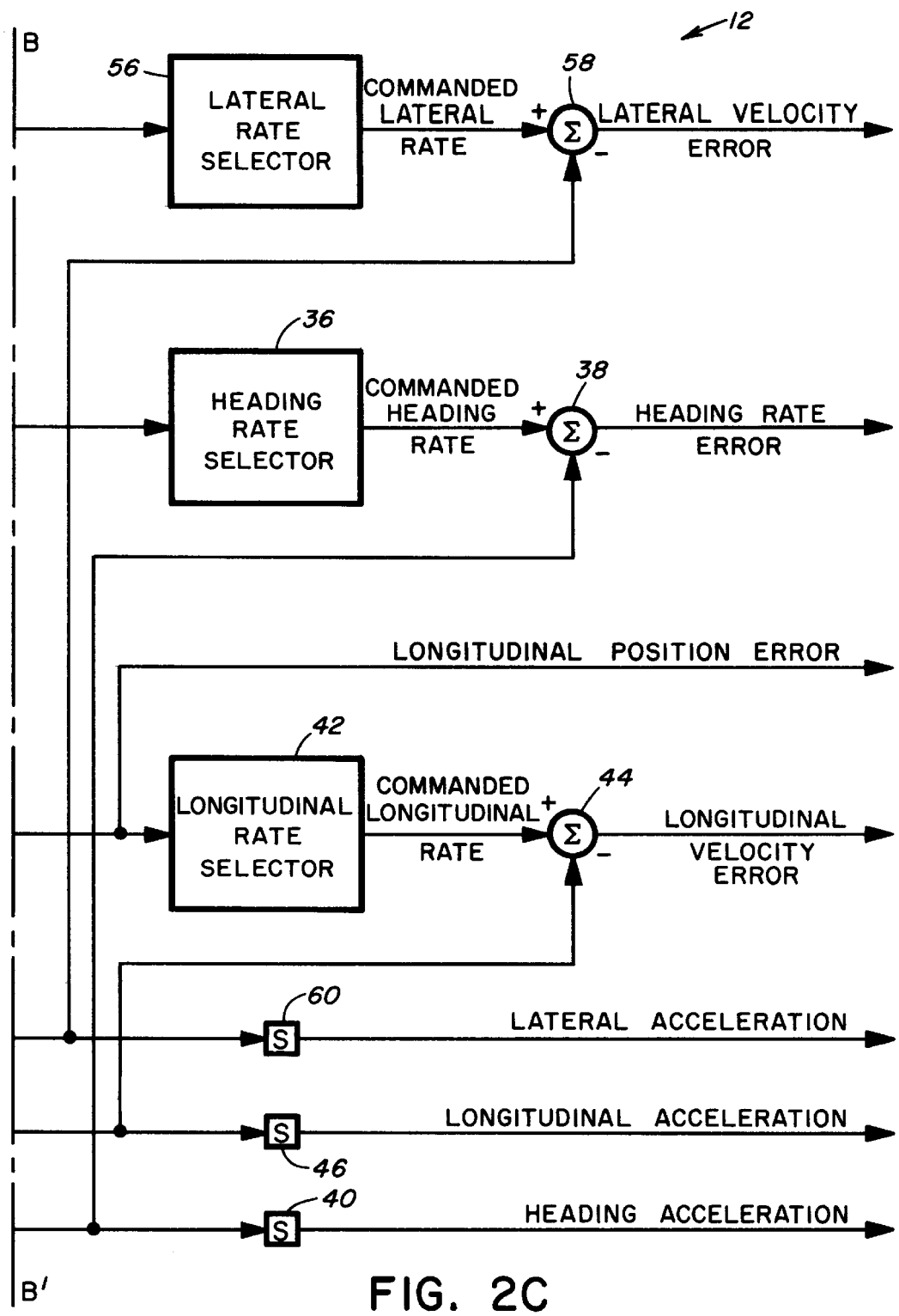

Referring still to FIG. 1, the control algorithm of the ACC system 10 includes four main components: a command processor 12, a bow thruster controller 14, a prop pitch controller 16, and a rudder controller 18. The command processor 12 receives nine inputs to the ACC system 10 which include the desired waypoint, the previous waypoint, and the LCAC vehicle location (or position), velocity and heading (or angular data). In FIGS. 1 and 2A, these inputs to the command processor 12 are labelled as follows: WAYPOINT HEADING, WAYPOINT X, WAYPOINT Y, HEADING, HEADING RATE, X, X VELOCITY, Y and Y VELOCITY. The command processor 12 processes these inputs and produces outputs which in FIGS. 1 and 2C are labelled as follows: HEADING RATE ERROR, HEADING ACCELERATION, LATERAL VELOCITY ERROR, LATERAL ACCELERATION, LONGITUDINAL VELOCITY ERROR, LONGITUDINAL ACCELERATION and LONGITUDINAL POSITION ERROR. All data is considered to have been formatted into the local Cartesian coordinate system (LCS) which is arbitrarily determined by the user. The command processor 12 outputs the processed data to the aforementioned three LCAC vehicle control surface controllers 14, 16, 18 of the ACC system 10. The bow thruster controller 14 calculates and generates a commanded angle output, labelled as BOW THRUSTER COMMAND, for sending to the bow thrusters of the LCAC vehicle. The prop pitch controller 16 calculates and generates a commanded angle output, labelled as PORT PROP PITCH COMMAND and STARBOARD PROP PITCH COMMAND, for sending respectively to the port and starboard propeller pitch controllers of the LCAC vehicle. The rudder controller 18 calculates and generates a commanded angle output, labelled as RUDDER COMMAND, for sending to the rudders of the LCAC vehicle. All angles can then be easily converted into voltages corresponding to control surface angles which then go directly into the LCAC vehicle's CSEP interface.

Command Processor

Referring to FIGS. 1, 2A, 2B and 2C, the command processor 12 of the ACC system 10 receives the nine above-mentioned inputs to the system 10. The command processor 12 processes these nine inputs to produce the seven above-mentioned outputs by performance of the following twenty steps described in reference to the detailed diagram of the multiple functions of the command processor 12 shown in FIGS. 2A to 2C.

Step 1: At circles 20 and 22 in FIG. 2A each labelled with a sigma symbol, first and second summation functions of the command processor 12 calculate the LCAC vehicle's Earth referenced position error. At the first summation function circle 20, the current vehicle X location input is subtracted from the desired WAYPOINT X location input, yielding as the difference an output labelled X ERROR which is the desired vehicle X location error. At the second summation function circle 22, the current vehicle Y location input is subtracted from the desired WAYPOINT Y location input, yielding as the difference an output labelled Y ERROR which is the desired vehicle Y location error. These outputs make up the vehicle's Earth referenced position.

Step 2: At block 24 in FIG. 2B, a first COORDINATE TRANSFORM function of the command processor 12 receives as inputs the X and Y ERROR outputs of step 1 and the vehicle HEADING input to the command processor 12 and transforms the inputs into an LCAC referenced position error vector. The LCAC referenced position error vector is made up of the outputs from the first COORDINATE TRANSFORM function block 24 which are the LATERAL and LONGITUDINAL POSITION ERROR outputs of the command processor 12.

Step 3: At block 26 in FIG. 2B, a second COORDINATE TRANSFORM function of the command processor 12 receives the current X and Y VELOCITY inputs to the command processor 12 constituting the LCAC vehicle's Earth referenced velocity vector, and transforms them into the LCAC vehicle's referenced velocity vector by receiving and using the vehicle HEADING input to the command processor 12. Thus, the LCAC referenced velocity vector is made up of the outputs from the second COORDINATE TRANSFORM function block 26 which are the LONGITUDINAL VELOCITY and LATERAL VELOCITY outputs.

Step 4: At block 28 in FIG. 2A, a DISTANCE CALCULATION function of the command processor 12 receives the current X and Y inputs to the command processor 12 and the WAYPOINT X and WAYPOINT Y inputs to the command processor 12 and calculates the linear distance, labelled the DISTANCE TO WAYPOINT output, from the LCAC vehicle's current position to the desired LCAC vehicle position. The vehicle's current position is represented by X and Y inputs, while the vehicle's desired position is represented by the WAYPOINT X and WAYPOINT Y inputs.

Step 5: At block 30 in FIG. 2A, a FOUR QUADRANT ARCTANGENT CALCULATION function of the command processor 12 receives current X and Y inputs to the command processor 12 and the WAYPOINT X and WAYPOINT Y inputs to the command processor 12 and calculates the heading (or angle), labelled the ANGLE TO WAYPOINT output, that would point the LCAC vehicle directly at the desired location or position.

Step 6: At block 32 in FIG. 2B, a HEADING SELECT LOGIC function of the command processor 12 receives as inputs the POSITION TO WAYPOINT output of Step 4, ANGLE TO WAYPOINT output to Step 5 and desired or WAYPOINT HEADING input to the command processor 12 and compares them. The HEADING SELECT LOGIC function at block 32 produces a vehicle heading, labelled the COMMANDED HEADING output, that is set equal to the desired vehicle heading, the WAYPOINT HEADING input, to the command processor 12 if the value of the DISTANCE TO WAYPOINT output of Step 5 is less than 35 meters.

Step 7: At circle 34 in FIG. 2B labelled with a sigma symbol, the third summation function of the command processor 12 calculates the error in the vehicle heading. The LCAC vehicle HEADING input to the command processor 12 and the COMMANDED HEADING output of Step 6 are received as inputs at the third summation function circle 34 and the COMMANDED HEADING is subtracted from the HEADING, yielding as the difference an output labelled HEADING ERROR which is the vehicle heading error.

Step 8: The HEADING ERROR output of Step 7 is formatted to be between ±180°.

Step 9: At block 36 in FIG. 2C, a HEADING RATE SELECTOR function of the command processor 12 receives the formatted HEADING ERROR of Step 8. At the HEADING RATE SELECTOR function block 36 a desired or COMMANDED HEADING RATE output is calculated by the following method:

(a) If the absolute value of the HEADING ERROR input is less than 1, then set the COMMANDED HEADING RATE output to −0.5 multiplied by the HEADING ERROR input.

(b) If the absolute value of the HEADING ERROR input is greater than 1 and less than 10, then set the COMMANDED HEADING RATE output to −0.5 multiplied by the sign of the HEADING ERROR input.

(c) If the absolute value of the HEADING ERROR input is greater than 10 and less than 20, then set the COMMANDED HEADING RATE output to −1.0 multiplied by the sign of the HEADING ERROR input.

(d) If the absolute value of the HEADING ERROR input is greater than 20 and less than 30, then set the COMMANDED HEADING RATE output to −3.0 multiplied by the sign of the HEADING ERROR input.

(e) If the absolute value of the HEADING ERROR input is greater than 30, then set the COMMANDED HEADING RATE output to −5.0 multiplied by the sign of the HEADING ERROR input.

Step 10: At circle 38 in FIG. 2C labelled with a sigma symbol, the fourth summation function of the command processor 12 calculates the heading rate error of the vehicle. The LCAC vehicle HEADING RATE input to the command processor 12 and the COMMANDED HEADING RATE output of Step 9 are received as inputs at the fourth summation function circle 38 and the HEADING RATE is subtracted from the COMMANDED HEADING RATE, yielding as the difference an output labelled HEADING RATE ERROR which is one of the seven outputs from the command processor 12.

Step 11: At block 40 in FIG. 2C labelled with S, a first order backwards differentiation function of the command processor 12 is performed on the HEADING RATE input to the command processor 12, yielding an output labelled HEADING ACCELERATION which is a second of the seven outputs from the command processor 12.

Step 12: At block 42 in FIG. 2C, a LONGITUDINAL RATE SELECTOR function of the command processor 12 receives the LONGITUDINAL POSITION ERROR output of Step 2. At the LONGITUDINAL RATE SELECTOR function block 42 a desired or COMMANDED LONGITUDINAL RATE output is calculated by the following method:

(a) If the absolute value of the LONGITUDINAL POSITION ERROR input is less than 1, then set the COMMANDED LONGITUDINAL RATE output to 0.5 multiplied by the LONGITUDINAL POSITION ERROR input.

(b) If the absolute value of the LONGITUDINAL POSITION ERROR input is greater than 1 and less than 15, then set the COMMANDED LONGITUDINAL RATE output to 0.5 multiplied by the sign of the LONGITUDINAL POSITION ERROR input.

(c) If the absolute value of the LONGITUDINAL POSITION ERROR input is greater than 15 and less than 25, then set the COMMANDED LONGITUDINAL RATE output to 1.0 multiplied by the sign of the LONGITUDINAL POSITION ERROR input.

(d) If the absolute value of the LONGITUDINAL POSITION ERROR input is greater than 25 and less than 100, then set the COMMANDED LONGITUDINAL RATE output to 2.0 multiplied by the sign of the LONGITUDINAL POSITION ERROR input.

(e) If the absolute value of the LONGITUDINAL POSITION ERROR input is greater than 100, then set the COMMANDED LONGITUDINAL RATE output to 5.0 multiplied by the sign of the LONGITUDINAL POSITION ERROR input.

Step 13: At circle 44 in FIG. 2C labelled with a sigma symbol, the fifth summation function of the command processor 12 calculates the downrange velocity error of the vehicle. The LCAC vehicle LONGITUDINAL VELOCITY output of the second COORDINATE TRANSFORM function block 26 and the COMMANDED LONGITUDINAL RATE output of Step 12 are received as inputs at the fifth summation function circle 44 and the LONGITUDINAL VELOCITY is subtracted from the COMMANDED LONGITUDINAL RATE, yielding as the difference an output labelled LONGITUDINAL VELOCITY ERROR which is another of the seven outputs from the command processor 12.

Step 14: At block 46 in FIG. 2C labelled with S, a first order differentiation function of the command processor 12 is performed on the LONGITUDINAL VELOCITY output of the COORDINATE TRANSFORM function block 26, yielding an output labelled LONGITUDINAL ACCELERATION which is the acceleration of the LCAC vehicle in the direction of the vehicle's heading and is also another of the seven outputs from the command processor 12.

Step 15: At blocks 48 and 50 in FIG. 2A, first and second STORE WAYPOINT functions of the command processor 12 receive and store the WAYPOINT X and WAYPOINT Y inputs to the command processor 12 and respectively produce PREVIOUS WAYPOINT X and PREVIOUS WAYPOINT Y outputs.

Step 16: At block 52 in FIG. 2A, a CROSS TRACK ERROR function of the command processor 12 receives as inputs the current X and Y inputs and the WAYPOINT X and WAYPOINT Y inputs to the command processor 12 and the PREVIOUS WAYPOINT X and PREVIOUS WAYPOINT Y from the first and second STORE WAYPOINT function blocks 48 and 50. From these inputs, the CROSS TRACK ERROR function block 52 calculates and generates a CROSS TRACK ERROR output.

Step 17: At block 54 in FIG. 2B, a LATERAL ERROR SELECT LOGIC function of the command processor 12 receives as inputs the CROSS TRACK ERROR output of Step 16, the DISTANCE TO WAYPOINT output from the DISTANCE CALCULATION function block 28, the LATERAL POSITION ERROR output from the first COORDINATE TRANSFORM function block 24 and the HEADING ERROR output from the third summation function circle 34. If the HEADING ERROR output is between ±20° and the value of the DISTANCE TO WAYPOINT output is greater than 35 meters, then the LATERAL POSITION ERROR output from the LATERAL ERROR SELECT LOGIC function block 54 is reassigned to the lateral position of the LCAC vehicle off the center line of the track between the current waypoint location and the previous waypoint location.

Step 18: At block 56 in FIG. 2C, a LATERAL RATE SELECTOR function of the command processor 12 receives as an input the LATERAL POSITION ERROR output of Step 17. At the LATERAL RATE SELECTOR function block 56 a desired or COMMANDED LATERAL RATE output is calculated by the following method:

(a) If the absolute value of the LATERAL POSITION ERROR input is less than 1, then set the COMMAND LATERAL RATE output to 0.5 multiplied by the LATERAL POSITION ERROR input.

(b) If the absolute value of the LATERAL POSITION ERROR input is greater than 1 and less than 10, then set the COMMAND LATERAL RATE output to 0.5 multiplied by the sign of the LATERAL POSITION ERROR input.

(c) If the absolute value of the LATERAL POSITION ERROR input is greater than 10 and less than 20, then set the COMMAND LATERAL RATE output to 1.0 multiplied by the sign of the LATERAL POSITION ERROR input.

(d) If the absolute value of the LATERAL POSITION ERROR input is greater than 20, then set the COMMAND LATERAL RATE output to 3.0 multiplied by the sign of the LATERAL POSITION ERROR input.

Step 19: At circle 58 in FIG. 2C labelled with a sigma symbol, the sixth summation function of the command processor 12 calculates the lateral velocity error of the vehicle. The LCAC vehicle LATERAL VELOCITY output of the second COORDINATE TRANSFORM function block 26 and the COMMANDED LATERAL RATE output of Step 18 are received as inputs at the sixth summation function circle 58 and the LATERAL VELOCITY is subtracted from the COMMANDED LATERAL RATE, yielding as the difference an output labelled LATERAL VELOCITY ERROR which is another of the seven outputs from the command processor 12.

Step 20: At block 60 in FIG. 2C labelled with S, a first order differentiation function of the command processor 12 is performed on the LATERAL VELOCITY output of the second COORDINATE TRANSFORM function block 26, yielding an output labelled LATERAL ACCELERATION which is the acceleration of the LCAC vehicle in the direction perpendicular to the vehicle's heading and is also another one of the seven outputs from the command processor 12.

Bow Thruster Controller

Figure 3:
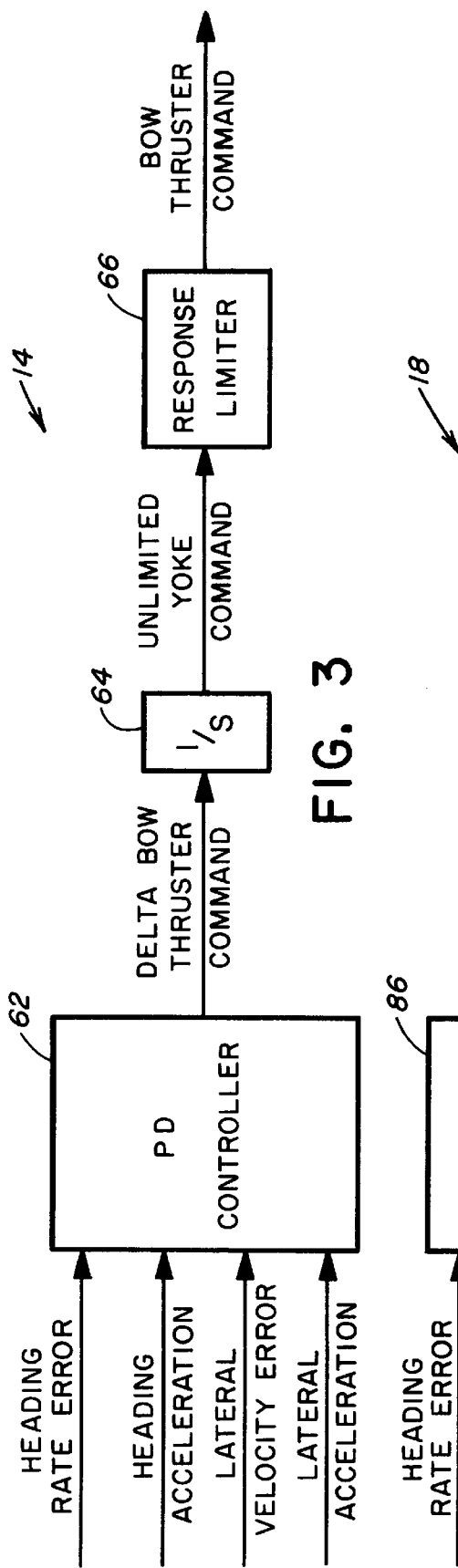
FIG. 3 is a detailed block diagram of a bow thruster controller of the ACC system.

Referring to FIGS. 1 and 3, the bow thruster controller 14 of the ACC system 10 receives as inputs the HEADING RATE ERROR, HEADING ACCELERATION, LATERAL VELOCITY ERROR and LATERAL ACCELERATION outputs from the command processor 12 and processes these four inputs to produce the BOW THRUSTER COMMAND output of the ACC system 10. In processing these four inputs, the bow thruster controller 14 performs the following three steps described in reference to the detailed diagram of the multiple functions of the bow thruster controller 14 shown in FIG. 3.

Step 1: At block 62 in FIG. 3, a proportional derivative PD CONTROLLER function of the bow thruster controller 14 receives the HEADING RATE ERROR, HEADING ACCELERATION, LATERAL VELOCITY ERROR and LATERAL ACCELERATION outputs of the command processor 12 and calculates and produces the delta wheel angle, labelled the DELTA BOW THRUSTER COMMAND output, using the following function:

Delta Wheel Angle=(1.0×HEADING RATE ERROR)−(2.0×HEADING ACCELERATION)−(1.0×LATERAL VELOCITY ERROR)+(2.0×LATERAL ACCELERATION).

Step 2: At block 64 in FIG. 3 labelled with an 1/S symbol, an integration function of the bow thruster controller 14 receives as the input the delta wheel angle, labelled as DELTA BOW THRUSTER COMMAND output of step 1, and integrates the delta wheel angle by taking the value of the BOW THRUSTER COMMAND calculated during the previous cycle through the algorithm of the ACC system 10 and adding the delta wheel angle thereto. The value of the BOW THRUSTER COMMAND is kept for the next iteration through the algorithm of the ACC system 10. The output produced by the integration function block 64 is labelled as the UNLIMITED YOKE COMMAND.

Step 3: At block 66 in FIG. 3, a RESPONSE LIMITER function of the bow thruster controller 14 receives as an input the UNLIMITED YOKE COMMAND output of Step 2 and limits the BOW THRUSTER COMMAND output of the ACC system 10 to be between ±45°.

Prop Pitch Controller

Figure 4:
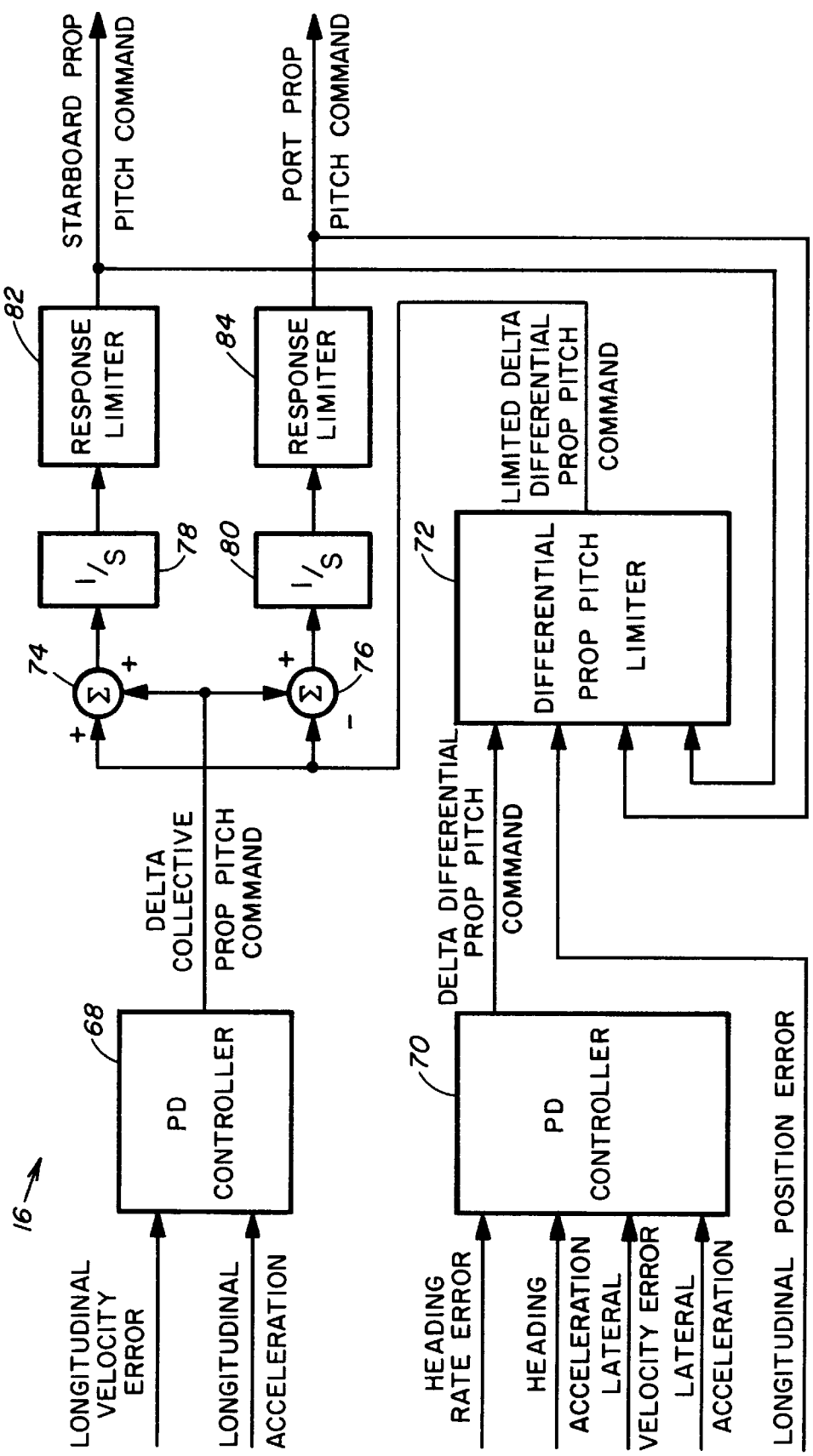
FIG. 4 is a detailed block diagram of a prop pitch controller of the ACC system.

Referring to FIGS. 1 and 4, the prop pitch controller 16 of the ACC system 10 receives as inputs the HEADING RATE ERROR, HEADING ACCELERATION, LATERAL VELOCITY ERROR, LATERAL ACCELERATION, LONGITUDINAL VELOCITY ERROR, LONGITUDINAL ACCELERATION and LONGITUDINAL POSITION ERROR outputs from the command processor 12. The prop pitch controller 16 processes these seven inputs to produce the PORT PROP PITCH COMMAND and STARBOARD PROP PITCH COMMAND outputs of the ACC system 10. In processing these seven inputs, the prop pitch controller 16 performs the following nine steps described in reference to the detailed diagram of the multiple functions of the prop pitch controller 16 shown in FIG. 4.

Step 1: At block 68 in FIG. 4, a first proportional derivative PD CONTROLLER function of the prop pitch controller 16 receives as inputs the LONGITUDINAL VELOCITY ERROR and LONGITUDINAL ACCELERATION outputs of the command processor 12 and calculates and produces an output, labelled DELTA COLLECTIVE PROP PITCH COMMAND, using the following proportional derivative equation:

Delta Collective Prop Pitch Command=(0.5×LONGITUDINAL VELOCITY ERROR)−(2.0×LONGITUDINAL ACCELERATION).

Step 2: At block 70 in FIG. 4, a second proportional derivative PD CONTROLLER function of the prop pitch controller 16 receives as inputs the HEADING RATE ERROR, HEADING ACCELERATION, LATERAL VELOCITY ERROR and LATERAL ACCELERATION outputs of the command processor 12 and calculates and produces an output, labelled DELTA DIFFERENTIAL PROP PITCH COMMAND, using the following proportional derivative equation:

Delta Differential Prop Pitch Command=(−0.5×LATERAL VELOCITY ERROR)+(2.0×LATERAL ACCELERATION)−(0.5×HEADING RATE ERROR)+(2.0×HEADING ACCELERATION).

Step 3: At block 72 in FIG. 4, a DIFFERENTIAL PROP PITCH LIMITER function of the prop pitch controller 16 receives as inputs the DELTA DIFFERENTIAL PROP PITCH COMMAND output of step 2, the LONGITUDINAL ERROR output of the command processor 12 and the STARBOARD PROP PITCH COMMAND and PORT PROP PITCH COMMAND outputs of the prop pitch controller 16 as calculated during the previous cycle through the algorithm of the ACC system 10. At the DIFFERENTIAL PROP PITCH LIMITER function block 72, a difference between the previous port and starboard prop pitches is calculated by subtracting the previous STARBOARD PROP PITCH COMMAND from the previous PORT PROP PITCH COMMAND, yielding the difference port starboard prop pitch.

Step 4: Also, at the DIFFERENTIAL PROP PITCH LIMITER function block 72, an average of the previous port and starboard prop pitches is calculated by adding the previous STARBOARD PROP PITCH COMMAND to the previous PORT PROP PITCH COMMAND and dividing the sum by 2, yielding the average prop pitch angle.

Step 5: Further, at the DIFFERENTIAL PROP PITCH LIMITER function block 72, from the difference port starboard prop pitch, the average prop pitch angle and the LONGITUDINAL ERROR, a differential prop pitch limit is determined as follows:
  (a) If the LONGITUDINAL ERROR is greater than 100 meters or less than −100 meters, then set the differential prop pitch limit equal to 0.0.
  (b) Otherwise, set the differential prop pitch limit equal to 40.0°.

Step 6: Finally, at the DIFFERENTIAL PROP PITCH LIMITER function block 72, an output labelled LIMITED DELTA DIFFERENTIAL PROP PITCH COMMAND is produced limited to the value either of (a) or of (b) of step 5 or if the absolute value of the difference port starboard prop pitch of step 3 is greater than the value either of (a) or of (b) of step 5, then set the output equal to (a) or (b) value divided by 2.0.

Step 7: At circles 74 and 76 in FIG. 4 each labelled with a sigma symbol, respective summation functions of the prop pitch controller 16 receive as inputs the DELTA COLLECTIVE PROP PITCH COMMAND output of step 1 and the LIMITED DELTA DIFFERENTIAL PROP PITCH COMMAND output of Step 6. At the first summation function circle 74 the two inputs are added, while at the second summation function circle 76 the LIMITED DELTA DIFFERENTIAL PROP PITCH COMMAND is subtracted from the DELTA COLLECTIVE PROP PITCH COMMAND.

Step 8: At blocks 78 and 80 in FIG. 4, each labelled with a 1/S symbol, integration functions of the prop pitch controller 16 respectively receive as the inputs the respective sum and difference of the Step 7 and respectively integrate the STARBOARD PROP PITCH COMMAND by adding the value of the previous STARBOARD PROP PITCH COMMAND calculated during the previous cycle through the algorithm of the ACC system 10 with the sum of Step 7 and integrate the PORT PROP PITCH COMMAND by adding the value of the previous PORT PROP PITCH COMMAND calculated during the previous cycle through the algorithm of the ACC system 10 with the difference of Step 7. The respective values of the STARBOARD PROP PITCH COMMAND and PORT PROP PITCH COMMAND are kept for the next iteration through the algorithm of the ACC system 10.

Step 9: At blocks 82 and 84 in FIG. 4, RESPONSE LIMITER functions of the prop pitch controller 16 receive as respective inputs the outputs of Step 8 from the integration function blocks 78 and 80 and limit the STARBOARD PROP PITCH COMMAND and PORT PROP PITCH COMMAND outputs of the ACC system 10 to be between 40° and −30°. These are the final prop values to be calculated during each cycle through the algorithm of the ACC system 10.

Rudder Controller

Figure 5:
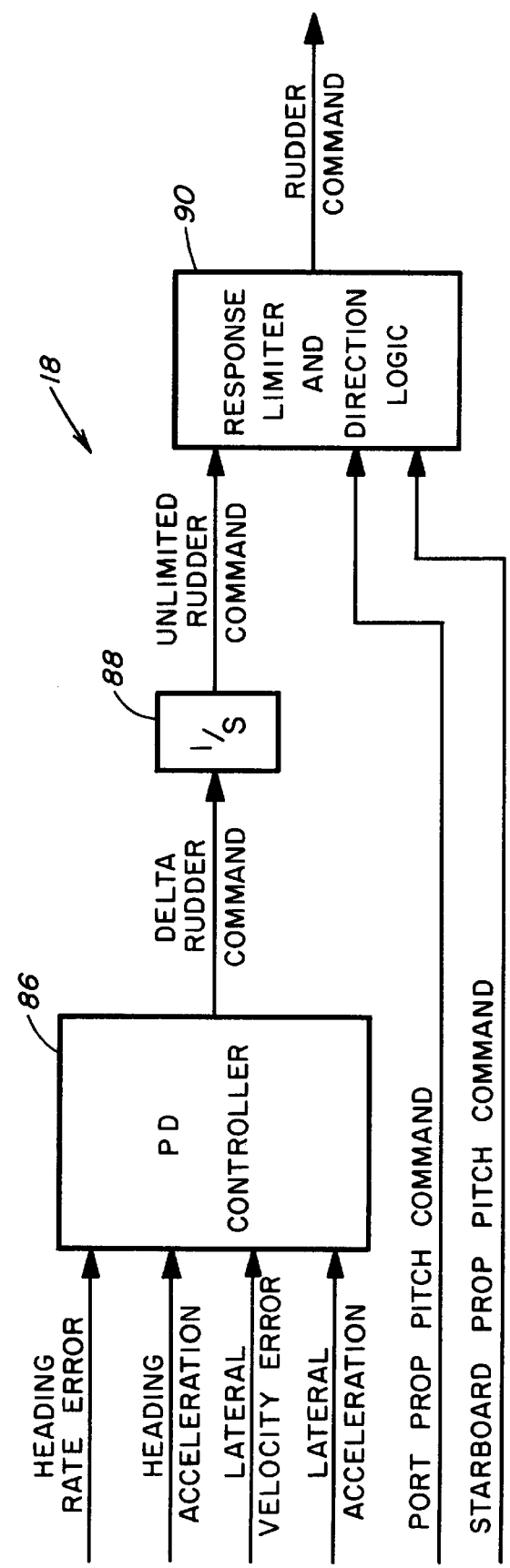
FIG. 5 is a detailed block diagram of a rudder controller of the ACC system.

Referring to FIGS. 1 and 5, the rudder controller 18 of the ACC system 10 receives as inputs the HEADING RATE ERROR, HEADING ACCELERATION, LATERAL VELOCITY ERROR and LATERAL ACCELERATION outputs from the command processor 12 and the PORT PROP PITCH COMMAND and STARBOARD PROP PITCH COMMAND outputs of the prop pitch controller 16. The rudder controller 18 processes these six inputs to produce the RUDDER COMMAND output of the ACC system 10. In processing these six inputs, the rudder controller 16 performs the following four steps described in reference to the detailed diagram of the multiple functions of the rudder controller 18 shown in FIG. 5.

Step 1: At block 86 in FIG. 5, a proportional derivative PD CONTROLLER function of the rudder controller 18 receives as inputs the HEADING RATE ERROR, HEADING ACCELERATION, LATERAL VELOCITY ERROR and LATERAL ACCELERATION outputs of the command processor 12 and calculates and produces an output, labelled DELTA RUDDER COMMAND, using the following function:

Delta Rudder Command=(0.75×LATERAL VELOCITY ERROR) −(1.50×LATERAL ACCELERATION)+(1.00× HEADING RATE ERROR)−(2.00×HEADING ACCELERATION).

Step 2: At block 88 in FIG. 5 labelled with an 1/S symbol, an integration function of the rudder controller 18 receives as the input the DELTA RUDDER COMMAND output of step 1 and integrates the input by taking the value of the RUDDER COMMAND calculated during the previous cycle through the algorithm of the ACC system 10 and adding the DELTA RUDDER COMMAND thereto. The value of the RUDDER COMMAND is kept for the next iteration through the algorithm of the ACC system 10. The output produced by the integration function block 88 is labelled as the UNLIMITED RUDDER COMMAND.

Step 3: At block 90 in FIG. 5, a RESPONSE LIMITER AND DIRECTION LOGIC function of the rudder controller 18 receives as inputs the UNLIMITED RUDDER COMMAND output of Step 2 and the STARBOARD PROP PITCH COMMAND and PORT PROP PITCH COMMAND outputs of the prop pitch controller 16 and calculates the average of the latter outputs of the prop pitch controller 16 referred to as the average prop pitch.

Step 4: Also, at block 90 in FIG. 5, the RESPONSE LIMITER AND DIRECTION LOGIC function sets or limits the RUDDER COMMAND output of the rudder controller 18 as follows:
  (a) If the average prop pitch is greater than zero, then the RUDDER COMMAND output is limited to plus or minus the following value: −((25.0/40)×ABSOLUTE VALUE (average prop pitch))+30.0; otherwise, limit the RUDDER COMMAND to plus or minus 30°.
  (b) If the average prop pitch is less than zero, then negate the RUDDER COMMAND output.
  (c) If the sign of the PORT PROP PITCH COMMAND output is different from the sign of the STARBOARD PROP PITCH COMMAND, then set the RUDDER COMMAND output to zero.

Advantages and Alternatives

Experimental field use of the ACC system 10 in LCAC vehicle operation during airgun testing has demonstrated an average decrease in mission times of forty percent over a manual ENATD mission using an experienced LCAC vehicle operator. While the autonomous algorithms were primarily developed for hovering and low speed LCAC vehicle repositioning, other tests have demonstrated the LCAC vehicle's capability to maintain course and speed, conduct coordinated turns at speeds of up to forty knots, and traverse predefined lanes while under autonomous control. These autonomous control capabilities of the LCAC vehicle show promise for other mine countermeasures mission areas.

In conclusion, alternatives to use of the ACC system 10 are remote control and manual operation of the LCAC vehicle. There is currently no known remote control system for the LCAC vehicle. Manual operation of the LCAC vehicle require considerable operator skill and training. Currently, graphical displays such as the Navigation Data Integrator and Hypack provide information to a LCAC vehicle operator to aid in mine countermeasures missions. However, the evaluations of the ACC system 10 in mine countermeasures missions has demonstrated a precision far greater than that possible while the LCAC vehicle is under manual control.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An autonomous craft controller system for automated control of operation of a landing craft air-cushioned vehicle, said automated system comprising:

(a) a command processor for receiving and processing multiple inputs relating to vehicle heading, location and velocity and, in response thereto, producing multiple outputs relating to vehicle acceleration and vehicle heading, velocity and position error;

(b) a bow thruster controller for receiving and processing as inputs some of the multiple outputs from said command processor and, in response thereto, producing a bow thruster command output;

(c) a prop pitch controller for receiving and processing as inputs some of the multiple outputs from said command processor and, in response thereto, producing port and starboard prop pitch command outputs; and (d) a rudder controller for receiving and processing as inputs some of the outputs from said command processor and outputs from said prop pitch controller and, in response thereto, producing a rudder command output.

2. The system of claim 1 wherein said inputs received by said command processor include vehicle waypoint heading and X, Y positions, and vehicle heading rate, X, Y positions and velocities.

3. The system of claim 2 wherein said outputs produced by said command processor include heading rate error, heading acceleration, lateral velocity error, lateral acceleration, longitudinal velocity error, longitudinal acceleration and longitudinal position error.

4. The system of claim 2 wherein said outputs produced by said command processor and received by said bow thruster controller include heading rate error, heading acceleration, lateral velocity error and lateral acceleration.

5. The system of claim 2 wherein said outputs produced by said command processor and received by said prop pitch controller include heading rate error, heading acceleration, lateral velocity error, lateral acceleration, longitudinal velocity error, longitudinal acceleration and longitudinal position error.

6. The system of claim 2 wherein said outputs produced by said command processor and received by said rudder controller include heading rate error, heading acceleration, lateral velocity error and lateral acceleration.

7. The system of claim 6 wherein said outputs received by said rudder controller further includes said starboard prop pitch command and port prop pitch command outputs.

8. The system of claim 1 wherein said outputs produced by said command processor include heading rate error, heading acceleration, lateral velocity error, lateral acceleration, longitudinal velocity error, longitudinal acceleration and longitudinal position error.

9. The system of claim 1 wherein said outputs produced by said command processor and received by said bow thruster controller include heading rate error, heading acceleration, lateral velocity error and lateral acceleration.

10. The system of claim 9 wherein said outputs produced by said command processor and received by said prop pitch controller include heading rate error, heading acceleration, lateral velocity error, lateral acceleration, longitudinal velocity error, longitudinal acceleration and longitudinal position error.

11. The system of claim 9 wherein said outputs produced by said command processor and received by said rudder controller include heading rate error, heading acceleration, lateral velocity error and lateral acceleration.

12. The system of claim 11 wherein said outputs received by said rudder controller further includes said starboard prop pitch command and port prop pitch command outputs.

13. The system of claim 1 wherein said outputs produced by said command processor and received by said prop pitch controller include heading rate error, heading acceleration, lateral velocity error, lateral acceleration, longitudinal velocity error, longitudinal acceleration and longitudinal position error.

14. The system of claim 13 wherein said outputs produced by said command processor and received by said rudder controller include heading rate error, heading acceleration, lateral velocity error and lateral acceleration.

15. The system of claim 14 wherein said outputs received by said rudder controller further includes said starboard prop pitch command and port prop pitch command outputs.

16. An autonomous craft controller system for automated control of operation of a landing craft air-cushioned vehicle, said automated system comprising:

(a) a command processor for receiving and processing multiple inputs which include vehicle waypoint heading, and X, Y positions, and vehicle heading rate, X, Y positions and velocities, and, in response thereto, producing multiple outputs which include heading rate error, heading acceleration, lateral velocity error, lateral acceleration, longitudinal velocity error, longitudinal acceleration and longitudinal position error;

(b) a bow thruster controller for receiving and processing as inputs said heading rate error output, heading acceleration output, lateral velocity error output and lateral acceleration output from said command processor and, in response thereto, producing a bow thruster command output;

(c) a prop pitch controller for receiving and processing as inputs said heading rate error output, heading acceleration output, lateral velocity error output, lateral acceleration output, longitudinal velocity error output, longitudinal acceleration output and longitudinal position error output from said command processor and, in response thereto, producing port and starboard prop pitch command outputs; and (d) a rudder controller for receiving and processing as inputs said heading rate error output, heading acceleration output, lateral velocity error output and lateral acceleration output from said command processor and said starboard prop pitch command and port prop pitch command outputs from said prop pitch controller and, in response thereto, producing a rudder command output.

* * * * *